United States Patent [19]

Leroy

[11] 3,870,226
[45] Mar. 11, 1975

[54] COMPACTION OF A SURFACE WITH A COMPACTOR HAVING WHEELS

[75] Inventor: Maurice Leroy, Sotteville les Rouen, France

[73] Assignee: Societe anonyme dite: Richier, Paris, France

[22] Filed: May 21, 1973

[21] Appl. No.: 362,203

[30] Foreign Application Priority Data
May 25, 1972 France .............................. 72.18773

[52] U.S. Cl. ..... 235/151.3, 235/150.21, 235/151.11, 235/197
[51] Int. Cl. ........................................... G06f 15/56
[58] Field of Search ... 235/151.3, 184, 197, 151.11, 235/150.21, 193, 194, 168

[56] References Cited
UNITED STATES PATENTS

| 3,244,864 | 4/1966 | Jones | 235/168 |
|---|---|---|---|
| 3,308,287 | 3/1967 | Levy et al. | 235/194 |
| 3,426,186 | 2/1969 | Takemura | 235/197 |
| 3,448,297 | 6/1969 | Rhodes | 235/194 |
| 3,475,601 | 10/1969 | Port | 235/194 |
| 3,626,262 | 12/1971 | Kelling | 235/151.11 |
| 3,648,033 | 3/1972 | Bader | 235/150.21 |
| 3,648,043 | 3/1972 | Caron | 235/197 |
| 3,655,956 | 4/1970 | Ley | 235/197 |
| 3,705,297 | 12/1972 | John | 235/193 |
| 3,712,977 | 1/1973 | Rice, Jr. | 235/194 |

Primary Examiner—Malcolm A. Morrison
Assistant Examiner—Errol A. Krass
Attorney, Agent, or Firm—Clelle W. Upchurch

[57] ABSTRACT

A device for continuously measuring a signal which varies as a hyperbolic or exponential function comprising an analog circuit having two signal input terminals, one of which is connected to a first signal source representative of at least one variable of the function to be measured and the other of which is connected to a second signal source representative of a second variable of the hyperbolic or exponential function. The analog circuit is so arranged that an output signal therefrom is proportional to the signal to be measured.

A particular application of the device is in controlling a compactor in such a manner as to obtain a continuous control of the quality of compaction of a material. In this case the first signal source provides a signal representative of the torque applied to the wheels of the compactor and the second signal source provides a signal proportional to the movement of the compactor.

12 Claims, 3 Drawing Figures

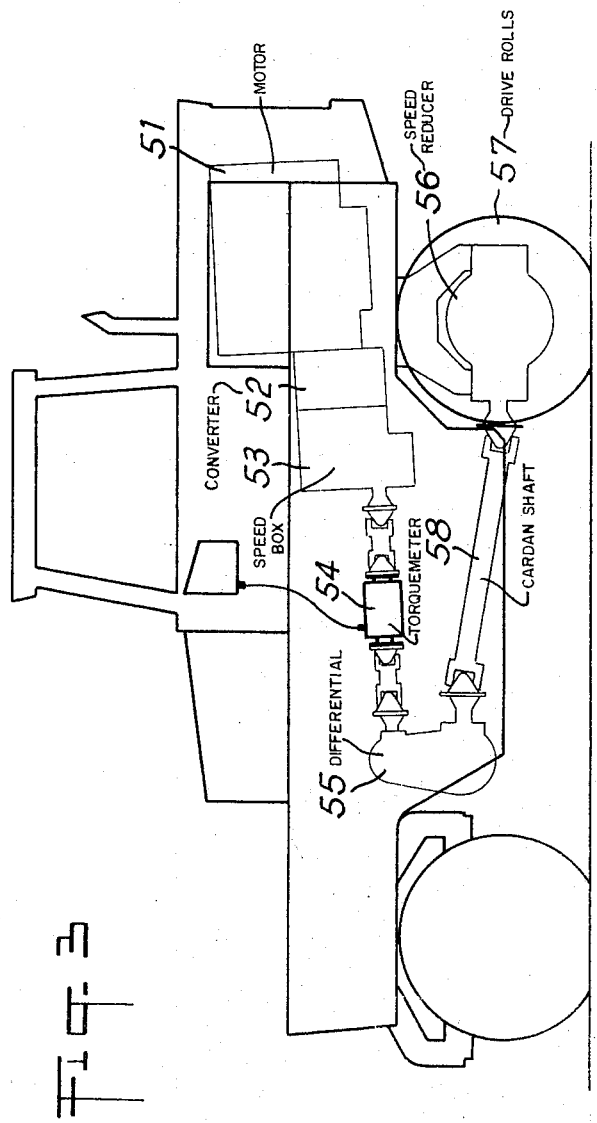

COMPACTION OF A SURFACE WITH A COMPACTOR HAVING WHEELS

The present invention relates to a device for continuously measuring a signal which varies as a hyperbolic or exponential function, and more particularly to a device which, when associated with a compactor, is capable of furnishing to the operator of the compactor an indication of the instant at which the intended compacting has effectively been attained.

At the present time no compactors are known having integrated control means capable of furnishing rapid, precise and meaningful indications permitting the exact number of transits necessary for correct compacting to be effected and thus ensuring optimum usage of the compactors.

In fact, the correct compacting of a material has hitherto been determined by successive density measurements as a function of the nature of the components of the material.

A disadvantage of this known method of measuring the compacting of material is that successive interruptions of compacting are necessary during which interruptions the density is measured. As a result of these frequent interruptions there is a reduced usage of the compactor which leads to an increase in the cost of the job.

According to the present invention there is provided a device for continuously measuring a signal which varies as a hyperbolic or exponential function, comprising at least one analog circuit, a frist input to the analog circuit which is connectable to a signal source for providing a first signal representative of at least one variable of the function to be measured and a second input to the analog circuit which is connectable to a signal source for providing a second signal representative of a second variable of the hyperbolic or exponential function, and an output for providing a signal solely proportional to the signal to be measured.

In this device, when it is associated with a compactor, the signal to be measured representative of the variable is the torque applied to the wheels of the compactor, while the signal representative of the hyperbolic or exponential function is supplied by a movement detector which furnishes a number of impulses proportional to the displacement of the compactor.

As will be explained later, a connection exists between the degree of compaction of a surface and the driving torque applied to the wheels of the compactor for moving it. Experiments carried out have shown that the torque decreases as the number of passes of the compactor increases, i.e. as the quality of compacting improves. If the curve representing the variations of the value of this torque is drawn, then one observes that the torque is a hyperbolic or exponential function of the number of passes performed.

In order to obtain a continuous control of the quality of the material to be compacted a great number of instantaneous values of the torque are considered and which are integrated so as to obtain an average torque signifying the reference of the measurement of length relative to the rotation of the wheels. The measurement is established on one reciprocation for determining a value of the average torque such that the condition of the ground affects this determination since the ground may slope in any manner.

The device in accordance with the present invention may comprise means indicating the operations to be carried out during compacting of the material, and this in order to facilitate the work of the operator by giving him during the compacting a certain number of indications such as measuring in progress, shifting a wheel, shifting a compactor, end of sweep, carry on or stop, it being understood that a certain number of data have previously been preset as a function of the work to be carried out.

The present invention also provides a device for continuously obtaining a signal representative of a variable which varies hyperbolically or exponentially and comprising at least one analog circuit, means for supplying to the circuit values of one variable, means for supplying to the circuit values of another variable, and means for receiving an output signal from the circuit, the analog circuit being such that the output signal is proportional to the variable to be measured having been derived from the hyperbolic or exponential function determined by the input variables.

The present invention further provides a device for measuring the degree of compaction of a surface by a roller in successive passes which comprises means for measuring the torque applied to the roller wheel or wheels, means for measuring the speed of the roller, and analog circuit for comparing signals representative of the torque and the speed according to a hyperbolic or exponential function, and means for producing an output signal representative of a variable of said function whereby the degree of compaction can be determined by measuring variation in the output signals between successive passes.

An embodiment of the present invention will now be described, by way of example, with reference to the accompanying drawings, in which:

FIG. 3 is a shcematic side view of an engine driven compactor in which is incorporated a torque meter to utilize the device of the present invention.

In the embodiment of the present invention compacting of a surface is considered to be finished when the variation of density, i.e. the variation of average torque $C_m$ between two successive passes of the machine is twice in succession less than a predetermined difference $e$, which is a function of the desired degree of compaction; thus for sweeps of the order $i$, $i+1$, $i+2$ $$C_{mi} - C_{mi+1} < e \text{ and } C_{mi+1} - C_{mi+2} < e$$

The purpose of checking twice in succession and insisting on differences smaller than the difference $e$ is to avoid the effect of random variations which could influence a single check.

In order to eliminate the effect of a possible slope of the terrain the measurements are made when the compactor is advancing and retreating.

Figure 1:
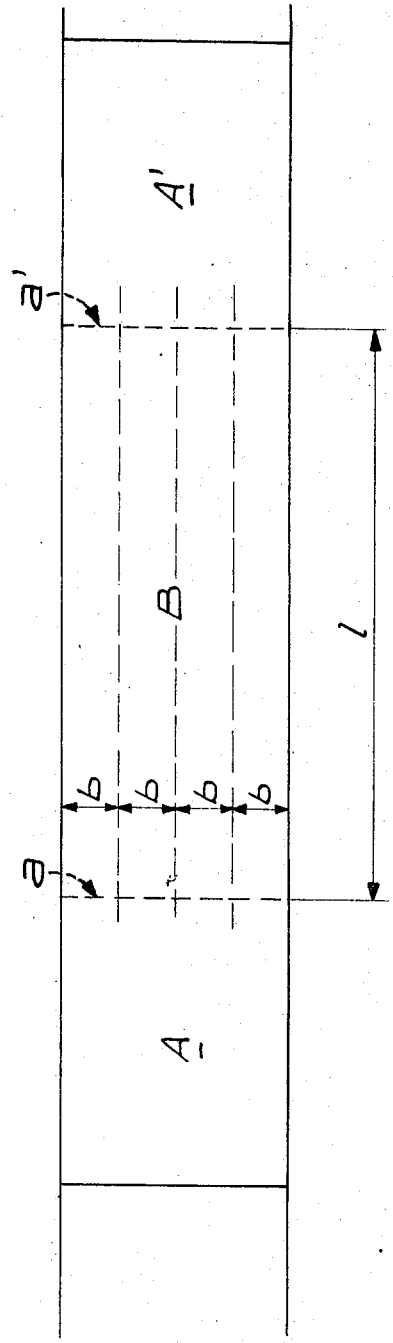
FIG. 1 is a schematic representation of a measuring procedure.

On the other hand, the measurements are effected during displacements of the compactor which it performs at a constant speed. For example, one selects a rectangular strip to be compacted of 40 metres length and 8 metres width. At each end of the rectangle a manoeuvring zone A and A' respectively, of 10 metres length, is reserved (FIG. 1).

The measuring zone B of length $l$, which in this Example is 20 metres long, stretches between the two manoeuvring zones A and A'.

In the zone A the compactor which, for example, has a useful width of 2 metres, starts and speeds up so as to pass the line $a$ which divides the manoeuvring zone from the measuring zone B at the desired speed which will be maintained constant throughout the measuring zone. The measuring device is triggered upon the compactor entering the measuring zone B. When the other limit of the measuring zone has been passed the compactor is braked in the manoeuvring zone A' and stopped on arriving at the end thereof. The reverse gear is engaged and the compactor takes off in the opposite direction so as to transverse the measuring zone at the same constant speed as before. However, care will have been taken to shift the compactor, while stationary, by the width of a wheel so as to ensure perfect covering of the material to be compacted over 2 metres width during this last pass.

When the compactor arrives in zone A it is braked and stopped. Its movement is reversed, it is shifted by a width corresponding to the useful width $b$ of compacting (here: $b = 2$ metres) and it is speeded up so as to arrive in the measuring zone B at the desired speed which will be maintained constant and at the same value as before. Having arrived in zone A' the compactor is braked, stopped, its progress is reversed and it is shifted by the width of a wheel prior to compacting the measuring zone on the way back. And so on and so forth. In a number of $p/2$ forward passes (here: $p/2 = 4$) and in an equal number of return passes the entire width of the measuring zone will have been compacted. The whole of these $p$ passes (here: $p = 8$) forms, by definition, a sweep of the measuring zone. It is important to note that during this sweep the measuring device is triggered every time the compactor enters the measuring zone and it is stopped each time the compactor leaves the measurement zone. The measuring will be made over a total displacement of the compactor equalling $p \times l$.

Further sweeps of the strip to be compacted are then made until the degree of compaction is considered satisfactory.

Figure 2:
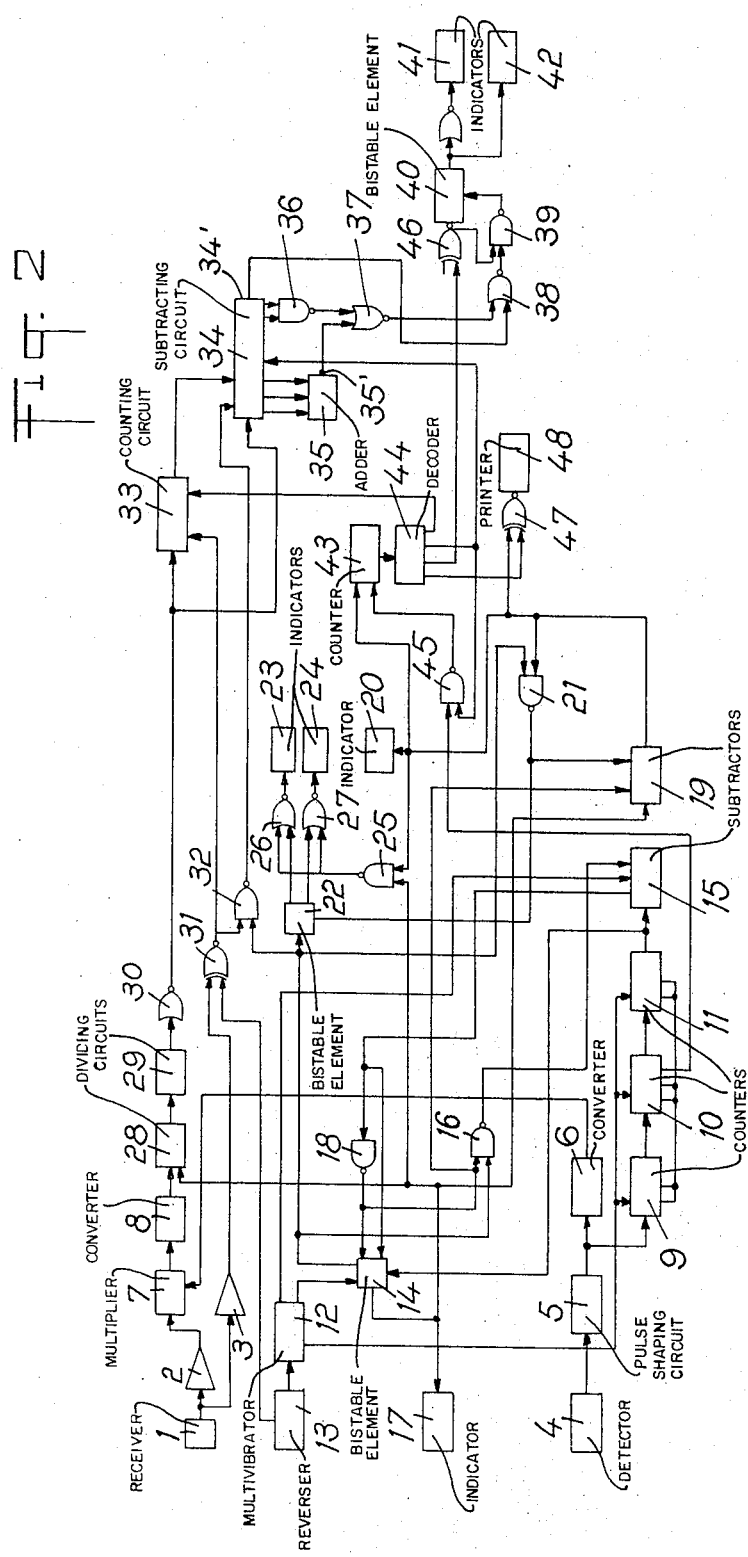
FIG. 2 is a schematic circuit diagram of the embodiment of the present invention.

Referring now to FIG. 2, the analog part of the device comprises an electronic receiver 1 which measures the displacement of a geared torquemeter and which supplies a signal proportional to the torque at the wheels of the compactor. During the course of movement the indication of the torquemeter oscillates about a neutral position corresponding to zero torque at the wheels. In the following, when the machine moves on flat and horizontal terrain, only propelled by its engine and in forward progress, the signal given by the receiver 1, corresponding to the indication which the torquemeter gives, will be considered as positive. An absolute value amplifier 2 is connected to the receiver 1 which transforms the algebraic value of the signal from the output of the receiver 1 into a positive value conforming to the equation $$S = A|E|$$

wherein
E is the potential at the input of the amplifier 2
S is the potential at the output of the amplifier 2
A is the gain of the amplifier 2;

A zero detector 3 which furnishes a logic level corresponding to the sign of the signal, i.e. "0" for a negative signal, "1" for a positive signal is coupled to the output of the receiver 1. A magnetic type of movement detector 4 is provided which supplies a number of impulses proportional to the rotation of the transmission shaft, which rotation is related to the movement of the compactor. The impulses from the movement detector are shaped by a pulse shaping circuit 5, such as a Schmitt trigger circuit. The shaped impulses are transmitted on the one hand to the logic portion which will be described hereafter and on the other hand to a AC-DC converter 7 which is in the form of an integrator and which converts the impulses coming from the shaping circuit 5 into a analog signal V proportional to their frequency. We thus have a magnitude V which represents the speed of the compactor and which can be written in the form $V = \alpha f$ (where $\alpha$ is a conversion constant and $f$ the number of impulses per unit of time).

The output of the amplifier 2 where the potential $A|E|$ is available is also connected to one input of a multiplier circuit 7 which is connected in series with a DC-AC converter 8 the output potential of which is applied to the input of the logic portion so as to be treated therein; the other input of the multiplier 7 is coupled to the output of the AC-DC converter 6 to receive the signal V.

The logic portion comprises a command logic which performs operations in a pre-established sequence, according to data relating to the length of the measuring and manoeuvring zones, the number of passes and the value of the threshold $e$, preset therein by the operator of the machine.

The command logic receives from the shaping circuit 5 the information concerning the movement of the compactor, one impulse per centimetre in this embodiment. This information is fed to three decade counters 9, 10, 11 mounted in series so as to obtain one impulse for a movement of 10 metres, i.e. the counters 9, 10, 11 can count to 1000. The one impulse is fed to a bistable element 14 and a subtractor or deductor 15.

After every change of direction of progress, a monostable multivibrator 12 which is connected to a progress reverser 13, produces a impulse which causes the decade counters 9, 10, 11 and the bistable element 14 to be returned to zero and the presetting of a number in the subtractor 15. This number takes into account the measuring length previously set in the apparatus. A "measuring in progress" indicator 17 is connected to the bistable element 14 and is energized when the compactor is moving in the measuring zone.

In the manoeuvring zone the subtractor 15 is inhibited by a level "1" on one of its inputs, the inhibiting being caused by an output from a "NAND" circuit 16. The "measuring in progress" indicator 17 is extinguished.

After the first measuring impulse of the decade counter 11 (in the example chosen this corresponds to a movement of 10 metres, the length of the manoeuvring zone A) the bistable element 14 changes state and the "measuring in progress" indicator 17 lights up. A NAND circuit 16 then delivers a "0" level at its output, thereby unblocking the subtractor 15.

After the last measuring impulse the subtractor 15 is at zero with one of its outputs at the level "1". The bistable element 14 again changes condition and returns to its original position; the "measuring in progress" indicator 17 now extinguishes and the subtractor 15 is again inhibited by virtue of a "1" output from the NAND circuit 16 while the compactor traverses the manoeuvring zone A'. Thus one complete pass of the compactor has been terminated.

A presettable subtractor or deductor 19 takes into account the number $p$ of passes for one sweep, the number $p$ already having been preset in the apparatus. The subtractor 19 is inhibited by a "1" output from the NAND circuit 18 so as to prevent the subtractor 19 taking any possible noise or stray pulse-like signals into account. Another input of the subtractor 19 is controlled by the bistable element 14 at the end of every measuring sequence. When the subtractor 19 is at zero, i.e. at the end of the sweep, a level "1" appears on its output which is connected to a NAND circuit 21 and an "end of sweep" indicator 20 lights up.

The presetting of the number $p$ in the subtractor 19 is obtained by the NAND circuit 21 when the "measuring in progress" indicator of the next sweep lights up.

A bistable element 22 connected to the bistable element 14 changes state at the end of every run in the measuring zone so as to alternatively command "shifting a wheel" 23 and "shifting a compactor" 24 indicators. This element is returned to zero at the same time as the presetting of the subtractor 19 by the circuit NAND 21. A suitable logic is comprised of the NAND circuit 25 and NOR circuits 26 and 27 and is arranged to extinguish the indicators "shifting a wheel" 23 and "shifting a compactor" 24 when the "measuring in progress" indicator 17 and the "end of sweep" indicator 20 are lit.

The output signal $F$ of the DC-AC converter 8 is directed to a circuit 28 where it is divided by $l$, after which the quotient is directed to a circuit 29 where it is divided by $p$. These dividing circuits 28 and 29 which are respectively preset as are the subtractor 15 and the subtractor 19, are inhibited when the compactor is not in a measuring zone.

To this signal $F$ corresponds at the output of dividing circuit 29 a frequency $F'$ which has the value $$F' = k/l \cdot p \cdot f \cdot |E|$$

where $f$ is the number of pulses per unit time and $k$ is a constant.

It can be agreed that the torque (and therefore $E$) remains at a substantially constant value when the machine carries out a pass of the order $j$ (there are $p$ passes for every sweep; thus $j$ varies from $j = 1$ to $j = p$). For a sweep of the order $i$ it can therefore be said that $E_i$, the average value of $E$ during this sweep, is expressed by the relation $$E_i = \frac{1}{p} \sum_{j=1}^{j=p} E_j$$

To this corresponds an average frequency $F'_i$ $$F'_i = k/l \cdot p \cdot f \cdot |E_i|$$

On the other hand, if the total number of impulses coming from the circuit 29 during the duration of one measurement effected during one sweep (i.e. over a length $p \times l$) of duration $T$ (constant duration since all the measurements are taken at the same constant speed) is $N_i$, then the value of $F'_i$ is given by the expression $$F'_i = N_i/T$$

Now, $f = \gamma \cdot l \cdot p/T$ ($\gamma$ constant, function of the apparatus).

The frequency $f$ is constant since the speed of the compactor is held constant in the measuring zone. Hence $$F'_i = k/l \cdot p \cdot f \cdot |E_i| = k/l \cdot p \cdot \gamma \cdot l \cdot p/T \cdot |E_i|$$

and $$N_i = k \cdot \gamma \cdot |E_i|$$

i.e.

$$N_i = K \cdot |E_i|$$

The number $N_i$ is thus solely proportional to $E$, i.e. to the torque at the wheels of the compactor.

A circuit 30 connected to the dividing circuit 29 inverts the signal issuing from the latter, so as to prevent disturbances in the following circuits during the counting and subtracting An "exclusive OR" gate 31 receives at one of its inputs the signal from the zero detector 3 and at its other input the signal of direction of progress coming from the progress reverser 13. The signal from the zero detector 3 is positive or negative, as has been stated above. The signal from the progress reverser 13 is by definition positive for advancing progress and negative in the opposite event. When the two signals which appear at the gate 31 are of the same sign the output of the gate 31 is at the logic level "0". This output is at logic level "1" when the two signals are of opposed signs. It should be noted that when the torque is resisting these signals are always of opposed signs; consequently, the output of the gate 31 is at the level "1". A NAND circuit 32 inverts the signal coming from the gate 31 when the apparatus is at "measuring in progress"; in the contrary case its output signal is at the level "1". The gate 31 and the NAND circuit 32 form an input logic.

This input logic excites a counting circuit 33 and a subtracting circuit 34. The counting circuit, known per se, is returned to zero by a logic of sequences and receives the adding impulses from the inverting circuit 30, remembering that these counting impulses answer to the formula:

$$N_i = K \cdot |E_i|$$

The gate 31 enables the sign of the torque E to be taken into account by effecting a subtraction when the latter is resisting (output of gate 31 at level "1"). Thus the figure which will appear on the counting circuit 33 at the end of the sweep will be $$N_i = K |E_i|$$

or again $$N_i = \frac{k}{p} \cdot \sum_{j=1}^{j=p} E_j$$

i.e.

$$N_i = K' \sum_{j=1}^{j=p} E_j$$

This figure is printed on a control printer at the end of the sweep.

The subtracting circuit 34 which is a subtractor having 5 decades receives by transfer (action on one of its inputs) the indication from the counting circuit 33, i.e. $N_i$ at the $i^{th}$ sweep and effects the difference $d = N_i - N_{i+}$ at the sweep $i+1$.

The NAND circuit 32, like the counting circuit 33, enables the sign of the torque to be taken into account by an action on an input of the subtractor 34. At the end of the measuring cycle the NAND circuit 32 holds this input of the subtracting circuit 34 at the level "1" (subtraction).

The subtractor 34 is connected by three of its decades to an adder circuit 35 which effects the difference $d - e$ where "$e$" is the preselected threshold and preset in the device.

An output 35' of the adder circuit 35 is at the level "0" when the threshold has been passed (when $d<e$) and at the level "1" in the opposite case.

Three possibilities may arise:

—threshold not passed: $d>e$, a level "1" appears at the output 35' of the adder circuit 35;

—threshold passed: $d<e$, a level "0" appears at the output 35' of the adder circuit 35. Since the comparison is only made on the three least significant decades it is necessary to control that the other two are at zero. To this end a level "1" appears on the output of these decades when the latter are at zero and in subtraction, by virtue of the NAND circuit 32 which places the subtractor 34 in "subtraction" when the measuring is terminated. The decades of the subtractor 34 to be controlled are connected to a NAND circuit 36, the output of which is connected to the input of a NOR circuit 37 the other input of which is connected to the output 35' of the adder circuit 35. The NAND circuit 36 and NOR circuit 37 detect the various conditions and produce at the output a level "1" when the threshold is passed.

—threshold passed with $d$ negative ($N_i<N_{i+1}$), a level "1" appears at the output 34' of the subtracting circuit 34.

A NAND circuit 38 takes into account the two preceding cases ($d<0$ and $d<e$) and a level "0" appears on its output when one of these two conditions is met (threshold passed). This output is connected to an input of a NAND circuit 39 which receives its other input through the intermediary of the exclusive OR circuit 46, a time pulse furnished by the sequence logic 43–44 and the output of which is connected to a double bistable element 40.

Return to zero of the latter is effected by the NAND circuit 39 when it receives the time pulse and the threshold has not been passed. When the threshold has been passed there is no return to zero and the time pulse causes a first rocking. When the threshold is passed twice in succession there are two rockings and the output of the double bistable element 40 causes extinction of a "carry on" indicator 41 and lighting of a "stop" indicator 42. As a result, the "stop" indicator 42 lights up only when the threshold has been passed twice in succession; the operator of the compactor thus knows when he may proceed to compact a further strip.

The sequence logic is formed of a decade counter 43, a binary decimal decoder 44 and gate circuit 45 and "exclusive OR" circuits 46 and 47.

The sequence logic is inhibited as long as the "end of sweep" indicator 20 is not lit. Its time pulses come from the counting circuit 10 (impulses of advance) through the intermediary of the gate 45.

When the "end of sweep" indicator 20 lights up the decade counter 43 is unblocked and counts the time pulses coming from the gate 45 (gate open). After decoding in the binary decoder 44 each pulse concerns a single output of the circuit:

—the first 44a effects presentation of the threshold;

—the second 44b controls a printer 48;

—the seventh 44c effects the counter-subtractor transfer;

—the ninth 44d effects the return to zero of the counter and closes the gate 45.

The outputs corresponding to the third, fourth, fifth, and sixth pulses are not used and the interval of time between the second and seventh pulse is used by the printer to perform its work; the eighth pulse isolates the transfer and the return to zero so as to prevent a disastrous overlapping of these two operations.

FIG. 3 is a schematic side view of an engine driven compactor in which is incorporated a torquemeter to utilize the device of the invention. The compactor is of a known kind as far as its general conception is concerned in relation to the present invention. The compactor particularly has a plurality of wheels or rollers serving for compacting material by rolling thereover. The motor 51 of the compactor comprises in the kinematic drive to the drive rolls 57 thereof a torquemeter 54 which supplies a signal to the electronic receiver 1 proportional to the torque exerted on the drive rolls of the compactor. It is advantageous to provide the torquemeter 54 between a speed box 53 and a differential 55, the speed box 53 being coupled by the intermediary of a converter 52 to the outlet of a drive motor 51 and the differential 55 being coupled by a carbon shaft 58 to a speed reducer 56 coupled to the drive rolls 57.

It is obvious that the device according to the invention can be applied to techniques other than compacting. In a general manner this device may be applied in the techniques where any phenomenon and its control vary simultaneously in a significant manner according to a hyperbolic or exponential law.

It is claimed:

1. A method for determining the degree of compaction of a surface by means of a compactor having wheels, in successive sweeps, comprising the steps of:
   A. determining a value representative of the torque applied to the wheels of the compactor during at least a part of each sweep;
   B. comparing the value determined during two successive sweeps, and
   C. determining the degree of compaction of the surface as a function of the result of the comparison.

2. A method according to claim 1 wherein the step determining a value representative of the torque applied to the wheels of the compactor during at least a part of each sweep comprises the steps of:
   A. determining a value representative of the instantaneous torque applied to the wheels;
   B. determining a value representative of the speed of the compactor; and
   C. computing the average value of the torque applied to the wheels of the compactor during said part of each sweep.

3. A device for determining the degree of compaction of a surface by a compactor having wheels, in successive sweeps, which comprises:
  A. means for providing a signal representative of the torque applied to the wheels during at least a part of each sweep;
  B. means for comparing the signals provided during two successive sweeps, and
  C. means for determining the degree of compaction as a function of the result of the comparison of said signals.

4. A device according to claim 3 wherein said means for providing a signal representative of the torque applied to the wheels during at least a part of each sweep comprises:
  A. means for providing a signal representative of the instantanious torque applied to the wheels of the compactor;
  B. means for providing a signal representative of the speed of the compactor; and
  C. an analog circuit for producing an output signal representative of the torque applied to the wheels of the compactor during said part of each sweep.

5. A device according to claim 4, wherein the speed signal is a pulse signal, and wherein the analog circuit comprises:
  A. a frequency-potential converter for converting the pulses of said speed signal to an analog signal;
  B. a multiplier having two inputs and an output, one of said two inputs being connected to receive said instantaneous torque signal and the other of said two inputs being connected to receive said analog signal;
  C. a potential-frequency converter having an input which is coupled to said multiplier output, and
  D. at least one circuit coupled to said potential-frequency converter for converting an output signal therefrom into a signal the frequency of which is solely proportional to the absolute value of the potential of said signal representative of the torque applied to the wheels of the compactor during said part of each sweep.

6. A device according to claim 5, further comprising an absolute value amplifier connected to said instantaneous torque signal providing means, and wherein said multiplier is coupled to said amplifier.

7. A device according to claim 6, wherein said analog circuit comprises means for producing an output signal representative of the average value of the torque, and further comprising means for treating said average value as a function of a predetermined threshold representative of the compacting to be obtained, and means for indicating operations to be carried out during the course of compacting said surface.

8. A device according to claim 3, wherein said means for treating comprises a sequence logic associated with an impulse counter and a subtractor capable of obtaining the difference between the impulses counted between two consecutive passes of the compactor, said counter and said subtractor each being associated with means adapted to enable the sign of the torque at the wheels to be taken into account; and further comprising a control logic for comparing said difference with that of a predetermined threshold.

9. A device as claimed in claim 8, wherein said subtractor is a five decade circuit, and further comprising an adder connected to three decades of said subtractor, said adder being capable of effecting the difference between the impulses counted between two successive sweeps.

10. A device according to claim 8, further comprising a first gate connected to said subtractor, a second gate having one input connected to said first gate, and a double bistable element connected to said sequence logic, said bistable element having an input connected to the output of said second gate.

11. A device according to claim 10, wherein said sequence logic comprises a decade counter connected to the output of a third gate, one input of said third gate being connected to an output of a binary decoder associated with said decade counter while the other input of said third gate is connected to receive timing impulses and two "exclusive OR" gates each connected to a separate output of said binary decoder a further output of which controls the transfer of the count from said impulse counter to said subtractor.

12. A device according to claim 11, wherein said double bistable element is connected to one of said "exclusive OR" gates and controls indicators.

* * * * *